May 23, 1939.   H. C. LISLE   2,159,619
FRUIT AND OTHER PRODUCT WASHING MACHINE
Filed Oct. 2, 1935   2 Sheets-Sheet 1
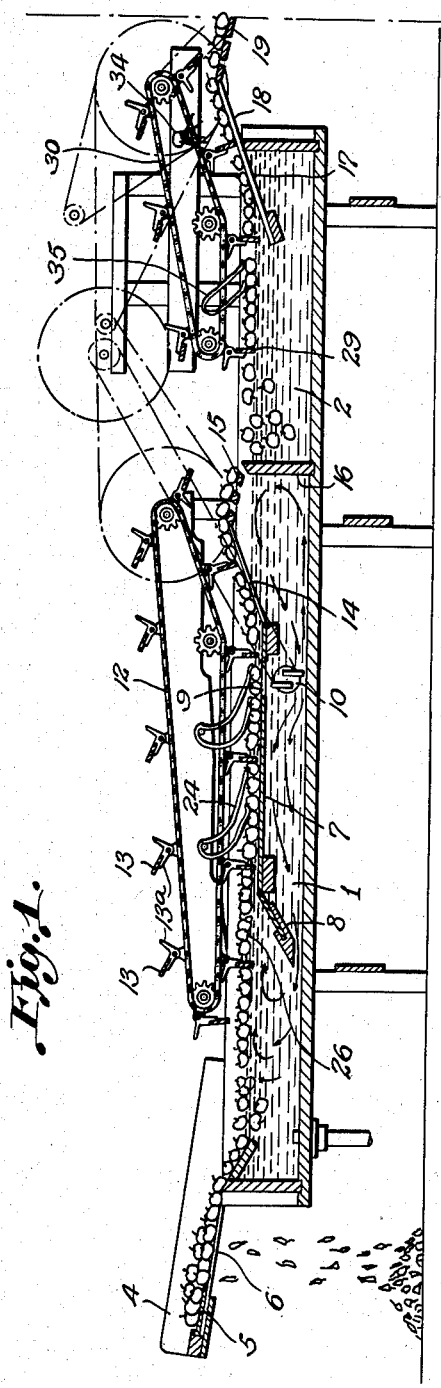
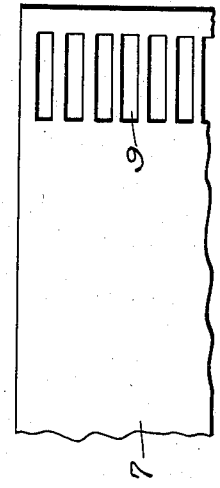
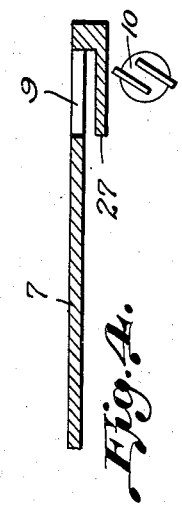
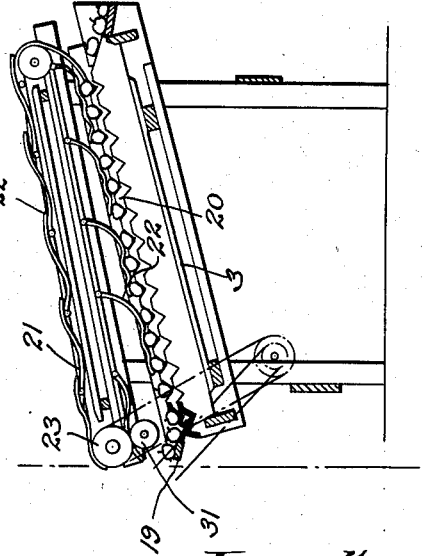
Inventor:
Howard C. Lisle May 23, 1939.  H. C. LISLE  2,159,619
FRUIT AND OTHER PRODUCT WASHING MACHINE
Filed Oct. 2, 1935  2 Sheets-Sheet 2

Inventor:
Howard C. Lisle

Patented May 23, 1939

2,159,619

UNITED STATES PATENT OFFICE 2,159,619

FRUIT AND OTHER PRODUCT WASHING MACHINE

Howard C. Lisle, Lansing, Mich., assignor to Food Machinery Corporation, San Jose, Calif., a corporation of Delaware Application October 2, 1935, Serial No. 43,270

4 Claims. (Cl. 146—194)

This invention relates to a machine and method of washing fruits, vegetables and like articles by what is known in the art as the "immersion method", in that the product is floated through a suitable solution for the occasion and the entire washing operation is accomplished entirely through immersion contact between the product and the washing or treating solutions, and is particularly adapted to treat fruit and the like for the removal of spray residue and other matter that has accumulated on the fruit during the growing and ripening season.

The problem of removing spray residue varies tremendously in different sections of the country, depending on the amount and kind of spray material that has been put on the fruit. The spray material is usually a stomach poison for the coddling moth or common worm. The coddling moth is very much worse in some sections than others, and east of the Rocky Mountains it, generally speaking, is much worse in the southern part of the fruit growing section, therefore, in these sections it is necessary to put on a greater number of sprays and use various material with the spray material, which is usually arsenate of lead, as the common poison, to make it stick to the fruit, spread over it, etc.

It is only natural that when various means are used to make the spray cover more thoroughly and stick more tenaciously that there will be more poison on the fruit at harvest time to remove.

In some fruit growing sections, it is found at harvest time that there is less of the poison material remaining on the fruit than the tolerance established by the Government and therefore they do not have to wash the fruit.

There is a condition, therefore, from the section where washing is not necessary to a section where very drastic means must be employed and where a residue equal to as much as twenty-five times the permissible tolerance is found on the fruit. This difference in the deposits remaining on the fruit at harvest time makes a tremendous difference in the job of removal. One grower might have less than ten per cent of the amount of spray material to remove to get under the Government tolerance while another might have to remove as much as ninety-seven per cent of the amount of residue on the fruit to get under the Government tolerance. The job of removal is not very difficult up to the point where sixty per cent must be removed, but anything over ninety per cent becomes much more difficult, and on the more difficult jobs it sometimes becomes necessary to use what is called a "wetting agent" in the solution, which is a substance that has the effect of reducing the surface tension of the fruit and thus permit the wet solutions to more completely cover the surfaces of the fruit.

This improved machine is particularly adapted to the removal of the more difficult jobs where large amounts of residue must be removed in the washing process.

The movement of the fruit through the solution is entirely controlled, as well as the depth of immersion and the fruit is automatically turned through a plurality of varying axes so that all surfaces will come in contact with the solution, and the solution is automatically circulated, either with or against the direction of movement of the fruit through the solution. The washing solution ordinarily used is of an acid nature, and in washing the residues from the surfaces of the fruit it is necessary that fresh solution is constantly contacting with the fruit in order to soften and remove the residue in a minimum of time.

Immersion methods have been in use for a long time but the trouble with all systems heretofore tried has been that when the fruit was placed in the solution and floated therein and moved through the machine, the body of solution closely adjacent and around each fruit would simply move along with the fruit so that it was found to be almost impossible to bring sufficient fresh solution into contact with the fruit while it was submerged to properly dissolve and loosen the adhering residues, and for this reason immersion systems have not been popular with the packing industry.

In the development of the fruit treating machine of this application this deficiency of the ordinary immersion system was taken into account and an effort made to completely remove this defect and it has been accomplished in a most efficient and practical manner.

The general arrangement of this new and improved washer comprises a solution tank in which is placed the treating solution with or without a "wetting agent" according to the requirements of the fruit being handled. A division platform is placed in the tank, in a horizontal position just below the surface of the body of solution, covering only a part of the surface area, more or less according to requirements, but this is amenable to suit the size of the machine and other conditions of operation.

As shown in the drawings a solution pump is immersed in the solution tank near the exit end and under and near the end of the division platform and is driven at a speed to produce a forced circulation toward the feed end of the tank, where the stream is turned and directed to flow over the division platform in the direction of the moving body of fruit. The exit end of the tank again turns the stream and directs it back to the pump or circulating device, which may be no more than a simple paddle wheel, for recirculation. The circulating device or a suitable circulating pump could as well be placed relative to the platform, so as to circulate the solution against the body of moving fruit, in which case it might be placed back of the exit end of the platform and more on a line with the top surface thereof so that the flow of the solution would be directed against the body of moving fruit instead of with the direction of movement of the body of fruit as shown. While the preferable manner of circulating the solution is with the body of moving fruit, but faster than the fruit moves so that fresh solution constantly surrounds each fruit, applicant wishes it understood that the opposite direction of circulating the solution will also be effective and practical in the removal of spray residue. The important thing in either direction of circulation is to constantly bring each fruit into contact with a flowing stream of solution so that fresh solution is constantly flowed over and around each fruit to thereby give the maximum of treating effect in the minimum of time.

The time of treatment and the depth of immersion are important factors in the treatment of fruits and the like for the removal of spray residue.

It has been found through experience that if fruit is immersed too deeply in an acid solution too much acid is forced into the calix end of the fruit which makes it difficult to wash out in the time ordinarily available for the washing operation, with the result that it will later on cause acid burns. This is one important advantage in the depth control board or table, the fruit cannot be forced too deeply into the solution, the table acting to hold the fruit and prevent it from going any farther below the surface of the solution than is desired.

In the operation of treating the fruit for the removal of spray residues it is also important and desirable that the fruit be turned over and over in the solution so that there will be no question as to the constantly changing contact of the fruit with fresh solution. In this improved machine this is accomplished by dragging suitable cloths or other flexible devices over the fruit, or moving the body of fruit under such devices fixed relative thereto, which devices will hold the fruit down in contact with the division board or platform and also by frictional contact therewith will turn each fruit over and over as it is moved along in contact with the depth control board or table. This combined action together with the stream of washing solution flowing over the body of fruit and faster than the fruit is moving, assures that each fruit will be subjected to the maximum washing and treating effect in the least time.

With a circulation of the solution, sufficient to cover each fruit with a constantly changing film of solution, or to have each fruit fully immersed in the solution and in complete surface contact therewith, the force of the flowing stream, when flowing in the direction of the body of moving fruit, would be of sufficient strength to carry the floating fruit along therewith so there would not be a sufficient change of solution around each fruit to properly loosen and remove the adhering residues, in other words the solution directly in contact with each fruit would soon become saturated with absorbed residue and would therefore be unable to take up any more with the result that the fruit would not be properly treated and would carry residue that a constantly changing solution would remove.

This has been the one great trouble with all previous machines using the immersion method of treatment for the removal of spray residues.

This trouble is most effectively overcome in the present invention in the following manner.

The fruit or the like is fed to the front end of the machine or tank and is dumped into the solution where it floats, and due to the flow stream set up in the tank of solution by the circulating device it floats with the stream and quickly reaches the entrance defined by the division platform or depth control board and is thereby kept in a single layer and immersed just the proper depth to receive the desired treatment.

In its flow toward the division platform, however, it is controlled by an endless chain device with hinged flights thereon, that is timed to move slower than the circulating stream of solution. The flights on this chain just dip into the top surface of the flowing stream of solution and are spaced to segregate groups of fruit and hold them between flights, the result being that the groups thus segregated are held back by the flights so that the stream of circulating solution flows past them and thereby supplies continuously, fresh solution to the surface of each immersed fruit which seems to remove the adhering residue about as efficiently as the flood type washers that pour immense quantities of solution over the fruit.

As soon as the groups of fruit restrained by the flights reach the division board they encounter the wiping cloths before mentioned which drag over the fruit and tend to turn each fruit through a plurality of axes and hold each fruit down onto the division board to act as a surface over which each fruit will roll and thus subject all surfaces to fresh flowing solution fully immersed and properly treated.

The medium for circulating the solution is helpful in keeping the solution well mixed and when adding fresh solution from time to time tends to mix it thoroughly and quickly with the solution already in the tank and thus keep all portions of the solution fully active and efficient.

The control of the movement of the fruit as above described brings up another very important point in the operation of machines of this type and shows clearly the importance of complete control of the movement of the fruit and the exact time of contact with the treating solution.

If the job of removing the adhering residue is comparatively easy the fruit will probably be kept in the solution for a treating time of approximately 30 seconds, using a cold solution and no "wetting agent". If the job is a little more difficult they leave the fruit in contact with the treating solution longer and up to 2 minutes. If this does not remove the residue the "wetting agent" is added and if that is not sufficient the solution is heated which very materially increases its efficiency. However, when hot acid is used the time of immersion must be very carefully timed and is usually limited to 2 minutes, or injury to the fruit will result.

By the improved method of treating the fruit for the removal of spray residue herein disclosed the exact timing of treatment is very easily carried out and the best possible results obtained.

While mentioning the use of a "wetting agent" for a better surface contact of the solution applicant wishes to call attention to a situation that exists in connection with such use in other machines.

Heretofore efforts have been made to treat fruit and the like for the removal of spray residues by spraying the treating solutions onto the fruit under the belief that by delivering large volumes of liquid through sprays the fruit would be fully covered with the solution. It has been found in practice, however, that the mere act of spraying the solution did not completely cover the fruit on account of the surface tension and that "wetting agents" were necessary to get a full and complete coverage.

When adding "wetting agents" to the solution and then spraying the solution onto the fruit so much foaming was developed that the accumulating foam filled the tanks and receptacles to overflowing and ran out on the floor and over the machine and had to be abandoned.

This fact is mentioned here to show clearly the difference between applicant's method of treatment and that of the machines using the spray method. Applicant can use the "wetting agents" where necessary without any trouble whatever, from foaming.

A complete unit embodying applicant's invention comprises an acid treating section, a water rinse section, a draining section, and a drying section, where a dryer is used, all hooked up as a complete operating unit. There is also an acid draining section between the acid treatment and the water rinse so that as much as possible of the acid solution is drained from the product before it reaches the rinse section and the rinse water is therefore usable for a longer time before it becomes too acid.

At the feed end of the machine there is provided a non-bruising sponge rubber pad onto which the fruit is dumped from the field baskets, and just ahead of the rubber pad are arranged a series of half round bars or slats spaced to permit leaves, twigs, and other debris to drop through and thus keep the treating solution clean.

The fruit speed control conveyor is arranged above the machine so that only the tip ends of the flights dip into the treating solutions and thus very little solution is carried by the flights and almost none gets on the chain proper because it drains away before the flights move over the top side of the conveyor.

There are other novel and advantageous features which will be fully explained as the description proceeds.

It is therefore an object of the invention to provide an immersion washer for fruits and the like that will give substantially the efficiency of operation of the flood type washers.

It is a further object of the invention to provide a machine for washing and treating fruits and the like wherein any type and kind of treating solution may be used.

It is also an object of the invention to provide means for circulating and agitating the treating solutions.

It is also an object of the invention to control the depth to which the fruit may be immersed in the treating solution.

It is also an object of the invention to control the exact time in which the fruit is subjected to the acid treatment.

It is also an object of the invention to control the movement of the fruit through the treating solution so that the circulating solution will move faster than the movement of the fruit.

It is also an object of the invention to move the fruit in one direction and the treating solution in another direction to thereby continuously flow the solution over the fruit.

It is also an object of the invention to provide a fruit washing and treating machine wherein a "wetting agent" may be added to reduce the surface tension of the fruit when necessary in difficult instances of residue removal.

It is also an object of the invention to thoroughly drain the adhering acid solution from the fruit before passing it to the next operation.

It is a further object of the invention to thoroughly rinse the adhering acid solution from the fruit before passing it from the machine.

It is a further object of the invention to provide a drying section after the rinse section if desired.

It is a further object of the invention to provide a hopper feed for the machine having a soft cushioning receiving chute where the fruit is deposited so it will not be bruised or damaged.

It is also an object of the invention to provide a trash separator just ahead of the solution tank to separate out leaves, twigs and other debris before the fruit rolls into the solution.

It is also an object of the invention to provide depressor means over the body of moving fruit to hold the fruit down into the solution and to contact therewith and roll it over and over.

It is a further object of the invention to provide a depth control platform over which the fruit is moved and which supports it while passing under the depressor means.

It is also an object to provide separate conveyors for the acid and rinse sections so that acid solution will not be carried over into the rinse section thereby.

It is also an object of the invention to provide means for heating the treating solution.

It is also an object of the invention to provide means for segregating groups of fruit and controlling their movement through the treating solution.

It is also an object of the invention to provide means for segregating groups of fruit and retarding their natural movement along with the circulating treating solution.

It is also an object of the invention to provide a control means for the movement of the fruit that has pivotal movement so as to enter the solution and segregate groups of fruit while the fruit is moving and without crowding or compacting the fruit.

With such objects in view as well as other advantages which may be inherent in the invention, consisting in the parts and combinations hereinafter set forth and claimed, it is understood that the several necessary elements and combinations constituting the same may be varied in their proportions, placements and general arrangement without departing from the scope and nature of the invention, and in order to make the invention more clearly understood, there are shown somewhat diagrammatically, in the accompanying drawings means and mechanism for placing the same in concrete form without limiting them to the construction shown.

In referring now to the drawings it is to be understood that they are not necessarily made to scale neither do they necessarily represent all parts in proper relative proportions as they were made to clearly show the respective relation of the various elements and components so as to give a clear and comprehensive understanding of the operation of the several parts making up the complete unit.

Like figures of reference indicate like parts in the several views.

Figure 1 is a vertical sectional elevation of the complete unit apparatus showing clearly the path of movement of the circulating treating solution and the subsequent operations on the product.

Figure 1a is a continuation of the structure shown in Figure 2.

Fig. 3 is a detail of a depth board showing a slatted arrangement of one end thereof.

Figure 4 is a detail of the circulating paddle wheel in relation to the depth board and with a horizontal solution deflecting plate.

Figure 2:
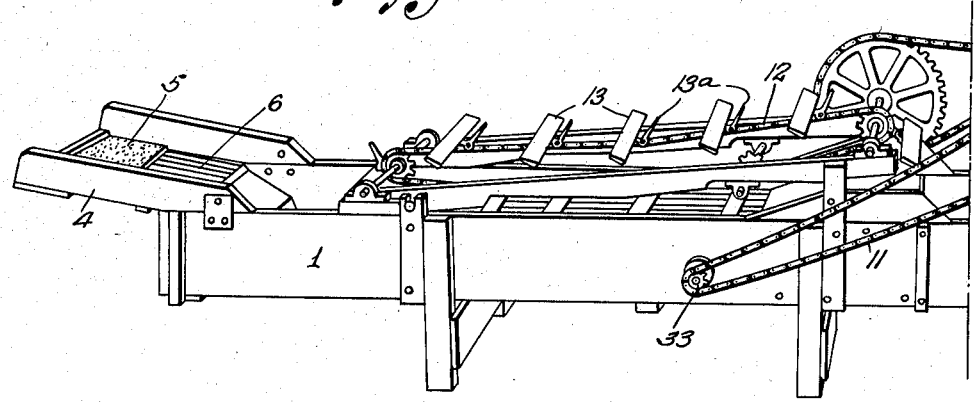
Figure 2 is a side elevation and part perspective of the top portion of a machine embodying the various component parts.
Figure 2A:
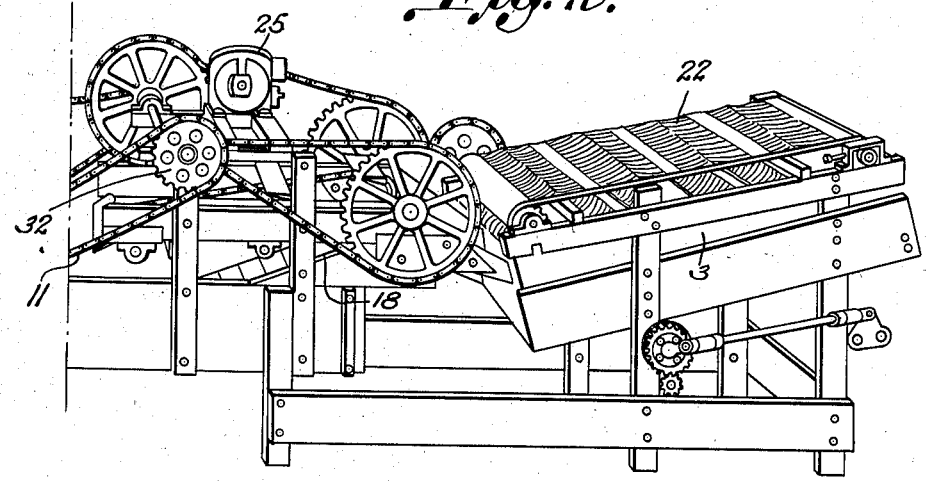
Figure 2a is a continuation of the structure shown in Figure 2.

The numeral 1 represents the acid solution tank and 2 the rinse water tank, and 2 the dryer at the exit end of the machine. At the feed end of the acid solution tank is a hopper 4 lined with some soft material like felt or sponge rubber 5. Following this are a series of rounded slats 6 through which debris such as stems, twigs, leaves, etc., sift through as the fruit rolls down the chute or hopper into the solution. 7 represents a depth control board over which the fruit or other product passes in a single layer, this board being immersed in the solution just deep enough to permit the fruit to be fully covered by the solution as it is moved over the depth board. 8 is a glass approach which is placed angularly and directs the moving body of fruit up onto the depth board 7. 9 is an opening in the depth board for the passage of solution. 10 is a paddle wheel solution circulating device located adjacent the opening 9 in the depth board 7 and is rotated by a suitable chain 11 in a direction to produce a circulation of the solution toward the feed end of the solution tank in the manner indicated by the arrows. Located directly over the solution tank is a combined conveying and retarding conveyor 12, provided with hinged flights 13, the lower run of the conveyor moving in the same direction as the flow of the treating solution over the depth board and the movement of the fruit. At the end of the depth board is an inclined glass approach leading up an incline which acts to direct the stream of fruit out of the solution and permits adhering solution to drain back into the tank, this is indicated at 14. At the end of this glass approach is a draining rack 15 over which the fruit is moved and being slatted permits the remaining excess solution to drain from the fruit before it passes into the rinse tank 2. The rinse tank 2 is separated from the acid tank by the partition 16. The fruit floats through the rinse tank and is moved in groups by a conveyor 17 to a glass approach 18 set on an incline which directs the fruit up and out of the rinse tank. At the end of this approach 18 is a drain section through which the excess rinse water drains off the fruit before is passes to the drier, as at 19.

The dryer comprises a conveyor known in the art as a "walk-over" conveyor which consists of a series of notched bars on which the fruit rests, each alternate bar being fixed and the intermediate bars being movable through a rocking and advancing movement which lifts the fruit from the notches in the fixed bars and carries it upward and along and leaves it resting in an advanced series of notches and this being continually repeated gradually advances the fruit through the drier in step movement. These advance bars are indicated at 20. Directly over the conveyor bars is an endless chain device 21 carrying a series of absorbent flaps which act as driers and polishers, indicated at 22 and as the flaps are carried along by the chain 21 they pass through a wringer device 23 which wrings the absorbed water therefrom so that each time the flaps contact with the advancing fruit they are substantially dry.

Arranged over the depth board 7 are a series of cloth depressors 24 secured to the frame of the machine and which lie on top of the layer of fruits and tend to depress it and hold it down in the solution and substantially in contact with the depth board and in so doing tend to turn each fruit through a plurality of changing axes so that it is quite thoroughly wiped which has the effect of loosening and wiping off the spray residue and assists very materially in producing a well cleaned product.

The entire apparatus is driven by the motor 25 through the various chains and sprockets clearly shown in Figs. 1 and 2.

*Operation*

The operation of a machine unit embodying the inventive features described and others to be mentioned would be substantially as follows:

The fruit to be treated is usually brought to the machine in crates or baskets and dumped directly on the chute hopper 4 where it falls onto the soft surface 5 to prevent it as much as possible from being bruised. Along with the fruit will be leaves, twigs and other debris which will mostly work its way down through the spaced slats 6 which act as a separator to remove this debris from the fruit. It rolls down along the round top slats and drops into the acid solution where it is quickly immersed and due to the circulation set up in the solution by the paddle wheel 10 the floating fruit will move toward the depth board 7 and any fruit that sinks more or less will encounter the inclined approach 8.

Just as the floating fruit reaches the beginning of the depth board it would normally tend to float right along with the circulation of the solution over the depth board but to prevent this and retard the movement of the fruit so the solution will flow past it and thus cover each fruit continually with fresh solution, the progressor boards 13 carried by the conveyor 12 now come into play. It will be noted that the progressor boards 13 are secured to the pivoted members 13a which are so positioned that they will present the boards 13 in a vertical position as they contact with the fruit floating in the solution. Immediately the boards 13 dip into the solution a group of fruit units will be segregated from the other units floating and their movement will be retarded so that they cannot flow forward as fast as the movement of the circulation of the solution.

It will be noted that the group of segregated fruits 26 is between two progressor boards but that the force of the circulation holds them against the forward board which indicates that they would move much faster if not retarded by the board 13. This retardation of the fruit to permit the circulating solution to continually flow past the fruit insures that each fruit will be continually surrounded with fresh solution and that therefore each fruit will receive the maximum of treatment during its passage through the machine.

As soon as the groups of fruit reach the depth control board 7 their immersion will be controlled by the adjustment of the board relative to the top surface of the solution, and since most fruit floats it is desirable that it be held down in the solution so that it will be fully immersed. This is accomplished by means of the fruit depressors 24 which are dragging cloths or other suitable material that hang freely down and drag over the fruit as it passes and thus force it down onto the depth control board and also produce enough friction on the fruit to cause it to turn through many changing axes during its passage and thus receive the maximum of treating effect. These cloths dragging over the fruit also act as wipers and tend to wipe off loosened residue as fast as the acid releases it. Fruit in water cannot be wiped efficiently unless it is supported in some manner and this combination of the depth board 7 and the dragging cloths 24 produce just the desired result, the fruit is efficiently wiped and the depth of submersion is controlled so that no acid burns will develop in the core area of the fruit which often happens where submergence is not controlled.

The treatment for the removal of adhering spray residue and other accumulations on the fruit is a most important step in the preparation of the fruit for market and this operation just described and as accomplished by the devices disclosed is giving much better results in actual practice than has heretofore been obtained. This manner of washing for the removal of spray residue permits the packer to stay well below the Government minimum of admissible residue on the fruit when ready for shipment.

A constant brisk circulation of the solution in and around the groups of retarded fruit is necessary in order to pass sufficient fresh solution over the fruit to thoroughly loosen and absorb the residues, and this circulation is accomplished by means of the paddle wheel 10 which is speeded to give the desired results.

In the handling and use of acid solutions of the nature used for washing fruit for the removal of residues it is very desirable that the solution be constantly agitated so that there is no settling of the heavier constituents and that the entire body of solution is always of the same degree of density. The paddle wheel 10 while producing the desired circulation of the solution to properly treat the fruit also acts as a stirring device and keeps the solution well stirred and of uniform consistency.

The opening 9 in the depth board is made like that shown in Figure 3 and comprises a series of slots to permit the circulating solution to pass down over the top of the paddle wheel 19 and again enter into circulation. The paddle wheel produces quite a turbulence just at the opening 9 and to prevent this to some extent if it causes any trouble with the handling of the fruit it may be controlled to some extent by placing baffles between the paddle wheel and the openings 9 as shown in Figs. 4 and 5.

The baffle 27 in Fig. 4 is placed substantially horizontal over the paddle wheel and will tend to direct the solution flowing through the openings 9 back into the circulation without coming into contact with the paddle wheel and this should eliminate some of the turbulence at this point.

Figure 5:
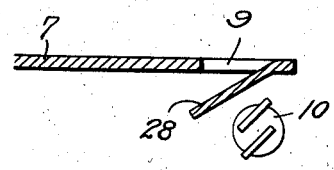
Figure 5 is a detail of the circulating paddle wheel in relation to the depth board and with an angular solution deflecting plate.

The baffle 28 in Fig. 5 is placed angularly over the paddle wheel 19 and will in a measure serve the same purpose of the baffle 27.

As the fruit passes the end of the depth control board 7 it is then conveyed by the progressor boards 13 up the approach 14 which is preferably made of plate glass so that a slippery surface will be provided for the fruit to slide over and thus avoid abrasions or damage to the tender skins, and being glass and non-absorptive, the acid solution carried by the fruit will be quickly drained away back into the tank. As the fruit passes the glass approach it rolls over a slatted drain board which effectually drains the remaining acid from the fruit before it enters the rinse water.

It is to be noted that only the tips of the progressor boards 13 enter the acid and that the greater part of adhering acid will drain off in conveying the fruit up the approach 14 so that they will be comparatively dry when passing along the upper run of the conveyor which eliminates almost all of the drip that usually attends operations of this character.

As the washed fruit tumbles into the rinse tank 2 it sinks temporarily which wets it thoroughly and then as it floats, the progressor flights 29 of the conveyor chain 30 engage the fruit and move it toward the approach 18 which is also of plate glass, and then it passes over a drain board 19 where the excess liquid drains away before entering the dryer.

The dryer shown in combination with this washing machine is provided with what is known in the trade as a "walk-over" conveyor and consists of a series of bars notched on their top edges as shown in Figure 1 and indicated at 20, each alternate bar is fixed and the intermediate bars are given an elliptical movement which carries the top edges forward and above the fixed bars with the result that the fruit is lifted by the movable bars and transferred from notch to notch in its advance along the conveyor. This gives an intermittent movement to the fruit and tends to turn it constantly. Arranged over the fruit bed is an endless chain device carrying a series of towel like fabrics that drag over the fruit and thoroughly wipe the moisture from it so that by the time the fruit has been conveyed to the exit of the dryer it will be found substantially dry. The towels accumulate considerable moisture and to keep them in a semi dry condition so they will absorb moisture from the fruit at each passage, a wringer is provided at 31 which wrings the accumulated moisture from the towels at each passage.

The paddle wheel 10 may be speeded to suit operating conditions and to produce as much or as little circulation of the washing solution as is desired. To change the speed of the paddle wheel it is only necessary to change the sprocket 32 or the sprocket 33 as is most convenient. If 32 is changed a larger sprocket will increase the speed while a smaller one will decrease the speed of the paddle wheel 10.

It should be mentioned that cloth depressors 35 are also placed in the rinse section to depress the fruit and hold it under the rinse liquid and to afford some wiping action. Also to give a final rinse with clear clean water a spray pipe 34 is provided just over the approach 18 which rinses the fruit and supplies fresh water constantly to the rinse section.

What is claimed as new and it is desired to secure by Letters Patent is:

1. An apparatus for removing accumulated residues from the surfaces of fruit and the like comprising a tank for holding a body of treating solution rotary means for circulating said solution, a rigidly positioned division board immersed in said solution just above said circulating means, ports in said board for the flow of solution and a deflecting plate under said ports and above said circulating means to prevent undue turbulence of the solution, the fruit in said solution being carried over said division board by the circulating medium.

2. In an apparatus for removing accumulated residues from the surface of fruit or the like product, a tank for holding a supply of treating liquid, means in said tank below the liquid level defining a fruit treating zone of liquid thereabove, means for circulating liquid in said tank to provide a fruit impelling current through said zone in the direction of the travel of the fruit, fruit engaging means separate from said liquid circulating means traveling through said zone in the direction of travel of the fruit at a slower speed, and means for driving said fruit engaging means and said liquid circulating means to provide a joint control over the travel of fruit through said zone, with said fruit engaging means acting to retard the fruit, whereby to provide a definite flow of liquid past the fruit and thereby insure a continuous supply of fresh treating liquid for engagement with the fruit.

3. In an apparatus for removing accumulated residues from the surface of fruit or the like product, a tank for holding a supply of treating liquid, a partition horizontally disposed in said tank below the liquid level to provide a fruit treating zone of liquid thereabove of a depth substantially equal to the diameter of the fruit being treated, fruit depressor means mounted over said zone for floating engagement with fruit passing therethrough, means for circulating liquid in said tank to provide a fruit impelling current through said zone, fruit engaging means separate from said liquid circulating means traveling through said zone in the direction of said circulation at a lesser speed, and means for driving said fruit engaging means and said liquid circulating means to provide a joint control thereof over the travel of fruit through said zone, whereby to provide a definite flow of liquid past the fruit and thereby insure a continuous supply of fresh treating liquid for engagement with the fruit.

4. In an apparatus for removing accumulated residues from the surface of fruit or the like product, a tank for holding a supply of treating liquid, a partition horizontally disposed in said tank below the liquid level to provide a fruit treating zone of liquid thereabove, means for moving fruit through said liquid treating zone, means separate from said feeding means for circulating the liquid in said tank to flow in the same direction as said fruit is being conveyed but traveling at a higher speed so that the liquid flows past the fruit as it moves through said liquid treating zone, and means for driving said fruit moving means and said liquid circulating means to provide a joint control thereof over the travel of fruit through said zone whereby to provide a definite flow of liquid past the moving fruit to thereby insure a continuous supply of fresh treating liquid for flowing over and past the moving fruit.

HOWARD C. LISLE.